3,073,738
p-PHENYLAZOANILINE NEMATOCIDE

Thomas R. Hopkins, Joplin, Mo., and Ralph P. Neighbors, Miami, Okla., assignors to Spencer Chemical Company, a corporation of Missouri
No Drawing. Filed Dec. 11, 1956, Ser. No. 627,548
5 Claims. (Cl. 167—30)

This invention relates to the control of nematodes and compositions useful therefore. More specifically, this invention relates to the control of nematodes by the use of p-phenylazoaniline, as represented by the formula $NH_2C_6H_4N=NC_6H_5$, and to novel compositions containing this compound, or its equivalents, as the active ingredient.

Nematodes are non-segmented worms found in the soil and in plant life, including the hookworm, pinworm, roundworm, trichina, gapeworm, guinea worm and whipworm. The term "nematode" as used herein is intended to include all forms through which nematodes pass in a life cycle, such as eggs, larvae and adults.

Plant nematodes or eelworms range in length from less than one-sixty fourth of an inch to about one-eighth of an inch. Plant nematodes are found in all soils in which plants will grow, and consequently every major crop is a potential victim of this pest. The annual damage as either directly or indirectly incurred from nematodes may be as great as three billion dollars.

Since the first steps to control nematodes by a chemical treatment in 1881, employing carbon disulfide, there has not been a material introduced which was entirely satisfactory. Even the most promising compounds which have become commercially available provide inadequate control and are expensive, toxic to animals, and phytotoxic to many plants as well.

We have discovered that p-phenylazoaniline and its salts are effective in the control of plant parasitic nematodes in the environment in which they naturally occur. Plant and soil nematodes may be effectively treated in situ. Furthermore, when used in the treatment of soils at the recommended nematocidal rates the compound is not phytotoxic. The compound is not appreciably volatile at room temperature, as contrasted to other commercially available nematocides. This fact is very important in treating plant nematodes because the material is easy to apply with the ordinary type of spray or dusting equipment, and after application the low volatility provides a persistence which insures a more thorough and prolonged exposure of the chemical to the nematodes.

Low mammalian toxicity, in which the $LD_{50}$ on albino mice (orally) is 670 mg./kilogm., makes application of p-phenylazoaniline safe.

An additional advantage of p-phenylazoaniline is the complete absence of halogen. Consequently, its ultimate decomposition in the soil should give rise only to compounds of carbon, nitrogen and oxygen devoid of halogen ions. Certain crops such as tobacco and potatoes, for instance, do not tolerate halogen ions well. Also, this nematocide prevents an increase in the salinity of the soil in which it is used, particularly, greenhouse, vegetable and reclaimed soils which are already high in salt concentration.

p-Phenylazoaniline is a yellow crystalline material which is slightly soluble in water. It is ordinarily prepared by a rearrangement of diazoaminobenzene in the presence of a strong acid. The compound as generally isolated from the acidic rearrangement is in the form of a salt, such as the sulfate or hydrochloride. Inasmuch as the activities of the free base and its salts are similar, it is more convenient and economical to employ the compound as a salt. Hence, all references to p-phenylazoaniline unless otherwise denoted, shall be taken to include the free base and any of its salts with organic and inorganic acids.

The following test procedures were employed in evaluating p-phenylazoaniline:

CONTACT TESTS

Water suspensions of the test chemicals are prepared in the concentration series of 500, 50, 5 and 0.5 p.p.m. Each concentration is placed in a separate quadrant of a Felsen dish or in a separate stoppered test tube. Freshly hatched larvae are then added to each concentration. After 24 hours, and again after 3–5 days, the contents of each quadrant or test tube is observed through a microscope. If a significant percentage kill is obtained, the dead nematodes are counted and the percentage kill is recorded as compared with the control containing no chemical. If all of the nematodes are killed in each quadrant the test is repeated with each concentration in separate dishes.

POT TEST

Water suspensions of the test chemicals are prepared in concentrations corresponding to 100 lbs. and 10 lbs. per acre. Four inch clay pots are filled with a soil which is infested with the nematode. The chemical suspension is then applied to the soil, and after one week, tomato seedlings are placed in the pots. After 6–8 weeks, the plants are removed and observed for the presence of nematode damage.

FUMIGATION TEST

This method consists of placing the nematode larvae in sand in contact with the chemical in sealed jars for 24 hours. The nematodes are then decanted and examined for viability. The results of the test represent the effect of both fumigation and contact.

The results of these tests, which were performed on p-phenylazoaniline and several of the most effective commercially available nemotocides, are included below for comparison.

The optimum rate of application as far as plant parasitic nematodes is concerned will depend upon the type of plant present as well as such factors as pH of the soil, soil condition and climatic conditions, and the particular type of nematode present. We have found, however, that excellent control of the Meloidogyne species, without danger of phytotoxicity, is exhibited at a dosage of about 100–250 lbs. per acre. Very small amounts are thus effective against nematodes in soil and plants.

The rate of application may be reduced considerably if adequate measures are taken to provide a thorough contact of the infested soil with the p-phenylazoaniline. Thus, as little as 10 lbs. per acre area or 25 lbs. per acre volume display excellent control when the mixture of soil and active agent is thorough.

Table
COMPARISON OF p-PHENYLAZOANILINE WITH COMMERCIALLY AVAILABLE NEMATOCIDES

| Nematocides | Contact test at 500, 50, 5 and 0.5 p.p.m. Lowest Effective Concentration (p.p.m.) | | | | Fumigation Test, Lowest Effective Concentration (p.p.m.), Rhabditus Nematodes, Sand | Pot Test, Root Knot Nematode |
|---|---|---|---|---|---|---|
| | Root Knot (Meloidogyne Larvae in Felsen Dishes, 4 Conc's./Dish) | | Mushroom (Ditylenchus) Nematodes in Stoppered Test Tubes | | | |
| | 24 Hours | 4-5 Days | 24 Hours | 4-5 Days | | |
| p-Phenylazoaniline | 50 | 5 | 50 | 5 | 1 | 100% control at 100#/A. |
| Nemagon a | 500 | 500 | 500 | 50 | | 100% control at 50#/A; injurious at 50#/A. |
| Vapam b | 500 | 50 | 5 | 5 | | Some control at 100#/A; phytotoxic at this rate. |
| EDB c | NS | NS | 500 | 500 | 10 | 100% control at 100#/A.; no control at 10#/A. |
| VC-13 d | NS | NS | NS | NS | | 50% control at 100#/A. | a 2,3-dibromochloropropane.
b Sodium N-methyldithiocarbonate.
c Ethylene dibromide.
d O,O-diethyl S-2, 4-dichlorophenyl phosphorothioate.
NS No significant control.

The application of p-phenylazoaniline to soils is readily achieved by the use of novel concentrates and compositions containing this compound as the active ingredient. To achieve a suitable dispersion on soils it is most convenient to employ compositions in which p-phenylazoaniline is combined with an inert carrier or diluent. The carrier may be a polar solvent, in most of which p-phenylazoaniline is soluble; it also may be a solvent which will not dissolve the compound, for suitable dispersions are also effective. Such compositions may be sprayed on the soil. Solid carriers, particularly as powders, of either organic or mineral composition are also suitable for use in the compositions. Some such solid carriers are talc, clay and pulverized limestone. Dusting is a convenient way to apply such powdered compositions.

Water is the preferred carrier because it is so widely available and inexpensive. p-Phenylazoaniline is essentially insoluble in water, however, and accordingly to provide compositions of uniform concentration from which the active compound will not settle out rapidly, a surface active agent is included in the compositions. The surface active agent may be ionic or non-ionic and may be a liquid or solid under ordinary conditions. Typical satisfactory surface active agents which may be used are alkali metal-higher alkylaryl sulfonates such as sodium dodecylbenzenesulfonate, fatty alcohol sulfates such as the sodium salts of the monoesters of sulfuric acid with n-aliphatic alcohols containing 8-18 carbon atoms, sodium salts of alkylnaphthalenesulfonic acids, long chain quaternary ammonium compounds, sodium salts of petroleum-derived alkylsulfonic acids, polyoxyethylene sorbitan mono-oleate and alkylaryl polyether alcohol. An adjuvant liquid may also be included in such compositions. Such liquid may be either soluble or insoluble in water and may be any solvent such as an alcohol, benzene, toluene, kerosene, or hexane, which aids in solubilizing or dispersing p-phenylazoaniline in water.

Concentrated compositions containing p-phenylazoaniline which may be subsequently diluted, as with water, to the desired concentration for application to soil are also provided. The advantages of such concentrates are that they are prepared by the manufacturer in a form such that the user need only mix them with a locally available carrier, preferably water, thereby keeping shipment costs to a minimum while providing a product which may be used with a minimum of equipment and effort. Such concentrates may contain about 50% or more of p-phenylazoaniline and a carrier or diluent, which may be a solid or liquid. Liquid carriers which either dissolve or suspend p-phenylazoaniline or its salts may be used. A wetting or surface active agent is also generally included to facilitate subsequent dilution or dispersion in water. However, the wetting agent itself may comprise the carrier in such concentrates. Wettable powder concentrates are prepared by mixing p-phenylazoaniline with an inert solid diluent such as fuller's earth, bentonite and hydrated aluminum magnesium silicate and a wetting agent. One representative wettable powder has the composition:

| | Percent (wt.) |
|---|---|
| p-Phenylazoaniline | 50 |
| Hydrated aluminum magnesium silicate | 40 |
| Sodiumsulfonate alkylnaphthalene | 7 |
| Ligninsulphonate | 2 |
| Methyl cellulose | 1 |

Such a wettable powder when mixed with water forms a dispersion particularly suitable for spray-applying to soils.

The following emulsifiable concentrate is particularly useful for high dilution rates:

| | Percent (wt.) |
|---|---|
| p-Phenylazoaniline | 30 |
| Triton X-151: a blend of an alkylaryl polyether alcohol and organic sulfonate | 10 |
| Atlas CIPIC emulsifier: a polyoxyethylene fatty acid ester | 10 |
| Cyclohexanone | 25 |
| Xylene | 25 |

Various changes and modifications of the invention can be made and, to the extent that such variations incorporate the spirit of this invention, they are intended to be included within the scope of the appended claims.

We claim:
1. The method of treating parasitic nematodes which comprises contacting the nematodes with a nematocidal amount of p-phenylazoaniline.
2. The method of treating plant parasitic nematodes which comprises applying a nematocidal amount of p-phenylazoaniline to plants and soils infected with the nematodes.
3. The method of treating plant parasitic nematodes which comprises applying a nematocidal amount of a salt of p-phenylazoaniline to plants and solids infected with the nematodes.
4. The method of killing plant parasitic nematodes which comprises contacting the nematodes with a nematocidal amount of a member of the group consisting of p-phenylazoaniline and salts thereof.
5. The method of killing plant parasitic nematodes which comprises applying from about 10 to 100 pounds of a member of the group consisting of p-phenylazo- aniline and salts thereof per acre to plants and soils infected with the nematodes.

References Cited in the file of this patent

UNITED STATES PATENTS

| | | |
|---|---|---|
| 1,982,909 | Flint | Dec. 4, 1934 |
| 2,057,044 | Meisenberg | Oct. 13, 1936 |
| 2,111,879 | Vivian | Mar. 22, 1938 |
| 2,335,323 | Tisdale | Nov. 30, 1943 |
| 2,377,446 | Payne | June 5, 1945 |
| 2,435,204 | Davidson | Feb. 3, 1948 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Grolito | Nov. 13, 1956 |
| 2,779,680 | Wolf | Jan. 29, 1957 |
| 2,419,073 | Hanner | Apr. 15, 1957 |
| 2,802,021 | Heininger | Aug. 6, 1957 |
| 2,802,831 | Wheeler | Aug. 13, 1957 |

FOREIGN PATENTS

| | | |
|---|---|---|
| 124,387 | Australia | June 12, 1947 |

OTHER REFERENCES

King: U.S.D.A., Handbook No. 69, May 1954, p. 49.

Frear: A catalogue of Insecticides and Fungicides Chronica Botanica Comp., 1948, vol. I, p. 145.

Frear: Chemistry of the Insecticides, Fungicides and Herbicides, 2nd ed., September 1948, pp. 108–122.

UNITED STATES PATENT OFFICE
CERTIFICATE OF CORRECTION

Patent No. 3,073,738  
January 15, 1963

Thomas R. Hopkins et al.

It is hereby certified that error appears in the above numbered patent requiring correction and that the said Letters Patent should read as corrected below.

Columns 3 and 4, footnote b, under the table, for "methyldithiocarbonate" read -- methyldithiocarbamate --; column 4, line 48, for "CIPIC" read -- CIPC --; line 67, for "solids" read -- soils --; column 6, line 4, for "Grolito" read -- Giolito --; line 6, for "Hanner" read -- Hammer --.

Signed and sealed this 16th day of July 1963.

(SEAL)  
Attest:

ERNEST W. SWIDER  
Attesting Officer

DAVID L. LADD  
Commissioner of Patents